United States Patent
Memik et al.

(10) Patent No.: US 8,442,440 B2
(45) Date of Patent: May 14, 2013

(54) HIERARCHICAL SPECTRUM SENSING FOR COGNITIVE RADIOS

(75) Inventors: Gokhan Memik, Evanston, IL (US); Seda Ogrenci Memik, Evanston, IL (US); Bill Mangione-Smith, Kirkland, WA (US)

(73) Assignee: Empire Technology Development LLC, Wilmington, DE (US)

( * ) Notice: Subject to any disclaimer, the term of this patent is extended or adjusted under 35 U.S.C. 154(b) by 774 days.

(21) Appl. No.: 12/511,955

(22) Filed: Jul. 29, 2009

(65) Prior Publication Data

US 2011/0028097 A1   Feb. 3, 2011

(51) Int. Cl.
*H04B 15/00*   (2006.01)

(52) U.S. Cl.
USPC ...... 455/62; 455/63.2; 455/67.11; 455/67.13; 455/423

(58) Field of Classification Search .......... None
See application file for complete search history.

(56) References Cited

U.S. PATENT DOCUMENTS

| | | | |
|---|---|---|---|
| 6,385,434 B1 | 5/2002 | Chuprun et al. | |
| 6,941,111 B2 * | 9/2005 | McLain et al. | 455/67.13 |
| 7,715,343 B2 | 5/2010 | Tomioka et al. | |
| 8,111,653 B2 | 2/2012 | Koyanagi | |
| 8,170,064 B2 | 5/2012 | Choi et al. | |
| 2006/0229029 A1 | 10/2006 | Waltho et al. | |
| 2007/0042733 A1 | 2/2007 | Tomioka | |
| 2007/0091720 A1 | 4/2007 | Woo et al. | |
| 2007/0117537 A1 | 5/2007 | Hui et al. | |
| 2007/0207737 A1 | 9/2007 | Hui et al. | |
| 2007/0253394 A1 | 11/2007 | Horiguchi et al. | |
| 2008/0080604 A1 | 4/2008 | Hur et al. | |
| 2008/0112310 A1 | 5/2008 | Choi et al. | |
| 2008/0155249 A1 | 6/2008 | Backof et al. | |
| 2008/0207131 A1 | 8/2008 | Coersmeier | |
| 2008/0214130 A1 | 9/2008 | Park et al. | |
| 2008/0233991 A1 | 9/2008 | Gillig et al. | |
| 2008/0268892 A1 | 10/2008 | Hamdi et al. | |
| 2009/0016340 A1 | 1/2009 | Eberle | |
| 2009/0060001 A1 * | 3/2009 | Waltho | 375/133 |
| 2009/0143019 A1 | 6/2009 | Shellhammer | |
| 2009/0149208 A1 | 6/2009 | Huttunen et al. | |
| 2009/0247201 A1 | 10/2009 | Ye et al. | |
| 2009/0253376 A1 * | 10/2009 | Parssinen et al. | 455/62 |
| 2010/0062718 A1 | 3/2010 | Zhou et al. | |
| 2010/0330919 A1 | 12/2010 | Gurney et al. | |

FOREIGN PATENT DOCUMENTS

WO   WO 2008/039872 A2   4/2008

OTHER PUBLICATIONS

U.S. Office Action dated Sep. 4, 2012 in U.S. Appl. No. 12/512,014.
U.S. Official Action dated Sep. 11, 2012 in U.S. Appl. No. 12/511,947.

(Continued)

*Primary Examiner* — Edward Urban
*Assistant Examiner* — Mohammed Rachedine
(74) *Attorney, Agent, or Firm* — Hope Baldauff, LLC

(57) ABSTRACT

The present disclosure generally describes methods and systems for spectrum sensing within a cognitive radio. Example methods may include but are not limited to scanning radio frequencies within an initial portion of the radio frequency spectrum and analyzing the frequencies scanned within the initial portion. Example methods may also include but are not limited to dividing the initial portion into first and second portions, and selecting one of the first and second portions for further analysis.

16 Claims, 3 Drawing Sheets

OTHER PUBLICATIONS

U.S. Notice of Allowance dated Oct. 26, 2012 in U.S. Appl. No. 12/508,549.
U.S. Office Action dated Mar. 12, 2012 in U.S. Appl. No. 12/512,014.
U.S. Official Action dated Mar. 20, 2012 in U.S. Appl. No. 12/511,947.
Devroye, N., et al., "Achievable Rates in Cognitive Radio Channels," IEEE Transactions on Information Theory, May 2006, vol. 52, No. 5, pp. 1813-1827.
U.S. Official Action dated May 18, 2012 in U.S. Appl. No. 12/512,018.
U.S. Official Action dated May 18, 2012 in U.S. Appl. No. 12/511,962.
Ye, Z. et al., "Energy Detection using Estimated Noise Variance for Spectrum Sensing in Cognitive Radio Networks", in Proc. of Wireless Communications and Networking Conference (WCNC), Las Vegas, NV, Mar./Apr. 2008, (6 pages).
Ye, Z. et al., "Spectrum Sensing Using Cyclostationary Spectrum Density for Cognitive Radios", in Proc. of 26th Workshop on Signal Processing Systems (SiPS), Shanghai, China, Oct. 2007, (6 pages).
Ye, Z. et al. "Digital Modulation Classification Using Temporal Waveform Features for Cognitive Radios", in Proc. of 18th Annual International Symposium on Personal, Indoor and Mobile Radio Communications (PIMRC), Athens, Greece, Sep. 2007, (5 pages).
Ye, Z. et al., "An FPGA Based All Digital Transmitter with Radio Frequency Output for Software Defined Radio", in Proc. of Design, Automation, and Test in Europe (DATE), Nice, France, Apr. 2007, (6 pages).
Gokhan Memik, William H. Mangione-Smith, "Increasing power efficiency of multi-core network processors through data filtering", CASES 2002: 108-116, (9 pages).
Gokhan Memik, Mahmut T. Kandemir, Alok Choudhary, "Design and Evaluation of a Smart Disk Cluster for DSS Commercial Workloads", Journal of Parallel and Distributed Computing (JPDC), vol. 61, Issue 11, pp. 1633-1664, (2001).
A. Mallik, Y. Zhang, G. Memik, "Automated Task Distribution in Multicore Network Processors using Statistical Analysis", in Proc. of International Symposium on Architectures for Networking and Communications Systems (ANCS), Orlando, FL, Dec. 2007.
Gokhan Memik and William H. Mangione-Smith, "NEPAL: A Framework for Efficiently Structuring Applications for Network Processors", in Proc. of Second Workshop on Network Processors (NP), held in conjunction with HPCA, Anaheim, CA, Feb. 2003.
Wendong Hu, et al. (May 2007). "Dynamic Frequency Hopping Communities for Efficient IEEE 802.22 Operation", IEEE Communications Magazine. pp. 80-87.
Petar Popovski, Hiroyuki Yomo, and Ramjee Prasad, "Strategies for adaptive frequency hopping in the unlicensed bands", IEEE Wireless Communications, Dec. 2006, http://kom.aau.dk/~petarp/papers/DAFH-AFR.pdf.
O. Simeone, J. Gambini, Y. Bar-Ness, U. Spagnolini, "Cooperation and Cognitive Radio," in Proceedings of IEEE ICC 2007, pp. 6511-6515, Jun. 2007.
"Functional Requirements for the 802.22 WRAN Standard", https://mentor.ieee.org/802.22/dcn/05/22-05-0007-46-0000-draft-wran-rqmts-doc.doc, (2005).
"IEEE 802.22 Wireless RAN Standard PHY and MAC Proposal", http://www.ieee802.org/22/Meeting_documents/2005_Nov/22-05-0098-00-0000_STM-Runcom_PHY-MAC_Outline.doc, (2005).
Haykin, S. "Cognitive Radio: Brain-Empowered Wireless Communications," IEEE Journal on Selected Areas in Communications, vol. 23, No. 2, pp. 201-220 (Feb. 2005).
Robust Distributed Spectrum Sensing in Cognitive Radio Networks Ruiliang Chen, Jung-Min Park, and Kaigui Bian IEEE INFOCOM 2008, Apr. 2008, Phoenix, AZ.
Toward Secure Distributed Spectrum Sensing in Cognitive Radio Networks Ruiliang Chen, Jung-Min Park, Y. Thomas Hou, and Jeffrey H. Reed First IEEE Workshop on Networking Technologies for Software Defined Radio (SDR) Networks, Sep. 2006, Reston, VA.
U.S. Office Action dated Jun. 29, 2012 in U.S. Appl. No. 12/508,549.
U.S. Office Action dated Nov. 18, 2011 in U.S. Appl. No. 12/511,962.
U.S. Office Action dated Nov. 22, 2011 in U.S. Appl. No. 12/512,018.
International Preliminary Report on Patentability for International Application No. PCT/US2010/039902 dated Jan. 24, 2012.
Cabric et al., "Implementation Issues in Spectrum Sensing for Cognitive Radios", Nov. 2004, Asilomar Conference on Signals, Systems and Computers, 5 pages.
Devroye et al., "Achievable rates and scaling laws for cognitive radio channels", Jan. 2008, EURASIP Journal on Wireless Communications and Network, vol. 2008, 12 pages.
Eksim et al., "Effective cooperative spectrum sensing in IEEE 802.22 standard with time diversity", Jul. 15-17, 2009, International Conference on Advances in Computational tools for engineering applications 2009 ACTEA '09, pp. 528-531. Abstract.
Gandetto et al., "A distributed approach to mode identification and spectrum monitoring for cognitive radios", Nov. 2005, Proceedings of the SDR 05 Technical Conference and Product Exposition, 6 pages.
Ghasemi et al., "Collaborative spectrum sensing for opportunistic access in fading environments", Nov. 2005, IEEE Symposium on New Frontiers in Dynamic Spectrum Acess Networks, 6 pages.
Ghasemi et al., "Spectrum sensing in cognitive radio networks: requirements, challenges and design trade-offs", Apr. 2008, IEEE Communications Magazine, pp. 32-39, 8 pages.
Neihart et al., "A Parallel, multi-resolution sensing technique for multiple antenna cognitive radios", May 27-30, 2007, IEEE International Symposium on Circuits and Systems (ISCAS), pp. 2530-2533, 4 pages.
International Search Report dated Oct. 8, 2010 in International Application No. PCT/US10/39805.
International Search Report dated Nov. 1, 2010 in International Application No. PCT/US10/39902.
International Search Report dated Oct. 15, 2010 in International Application No. PCT/US10/399918.
International Search Report dated Nov. 8, 2010 in International Application No. PCT/US10/39912.
International Search Report dated Nov. 3, 2010 in International Application No. PCT/US10/39903.

* cited by examiner

US 8,442,440 B2

HIERARCHICAL SPECTRUM SENSING FOR COGNITIVE RADIOS

REFERENCE TO RELATED APPLICATIONS

This application is related to the following co-pending applications, application Ser. No. 12/511,947 entitled "Location and Time Sensing Cognitive Radio Communication Systems" filed Jul. 29, 2009; application Ser. No. 12/512,018 entitled "Spectrum Sensing Network For Cognitive Radios" filed Jul. 29, 2009; application Ser. No. 12/511,962 entitled "Reputation Values in A Spectrum Sensing Network" filed Jul. 29, 2009; application Ser. No. 12/508,549 entitled "Secure Cognitive Radio Transmissions" filed Jul. 23, 2009; and application Ser. No. 12/512,014 entitled "Cognitive Radios For Secure Transmissions" filed Jul. 29, 2012.

BACKGROUND

The electromagnetic radio spectrum is a natural resource, the use of which by transmitters and receivers is licensed by governments. In many bands, spectrum access is a more significant problem than physical scarcity of spectrum, in large part due to legacy command-and-control regulation that limits the ability of potential spectrum users to obtain such access. Indeed, if portions of the radio spectrum were scanned, including in the revenue-rich urban areas, one would find that some frequency bands in the spectrum are largely unoccupied most of the time; some other frequency bands are only partially occupied; and the remaining frequency bands are heavily used.

The underutilization of the electromagnetic spectrum has led to the view that spectrum holes within the electromagnetic spectrum exist. As used herein, a spectrum hole exists when a band of frequencies assigned to a primary user is not being utilized by that user, at a particular time and specific geographic location. By making it possible for a secondary user to access the band of frequencies within a spectrum hole, utilization of the electromagnetic spectrum may be improved. A cognitive radio, inclusive of software-defined radio, has been proposed as a means to promote the efficient use of the electromagnetic spectrum by exploiting the existence of spectrum holes.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
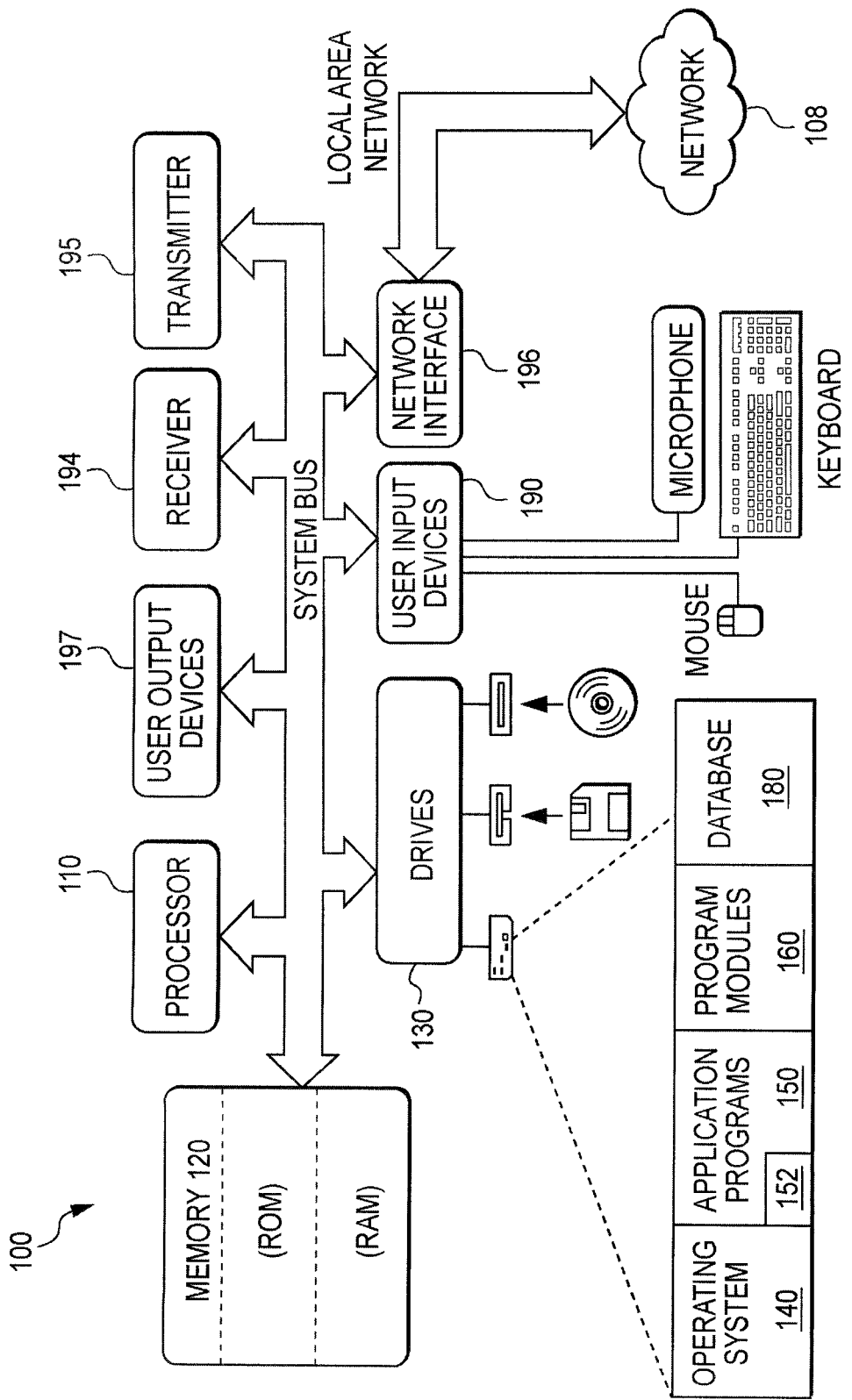
FIG. 1 depicts a cognitive radio.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

In the following description, algorithms and/or symbolic representations of operations on data bits and/or binary digital signals stored within a computing system, such as within a computer and/or computing system memory may be presented. An algorithm is generally considered to be a self-consistent sequence of operations and/or similar processing leading to a desired result where the operations may involve physical manipulations of physical quantities that may take the form of electrical, magnetic and/or electromagnetic signals capable of being stored, transferred, combined, compared and/or otherwise manipulated. In various contexts such signals may be referred to as bits, data, values, elements, symbols, characters, terms, numbers, numerals, etc. Those skilled in the art will recognize, however, that such terms may be used to connote physical quantities. Hence, when terms such as "storing", "processing", "retrieving", "calculating", "determining" etc. are used in this description they may refer to the actions of a computing platform, such as a computer or a similar electronic computing device such as a cellular telephone, that manipulates and/or transforms data represented as physical quantities including electronic and/or magnetic quantities within the computing platform's processors, memories, registers, etc.

This disclosure is drawn, inter alia, to methods, apparatus, and systems related to cognitive radios. The present disclosure makes use of the discovery that a hierarchical approach to spectrum sensing may be more efficient and may be less processor intensive and less time consuming manner, and may be more energy efficient.

As used herein, the phrase "cognitive task" may include one or more of (1) radio-scene analysis, (2) estimating interference temperature (a metric which quantifies sources of interference in a radio environment), (3) detecting spectrum holes, by spectrum sensing, (4) channel identification, (5) estimation of channel-state information, (6) prediction of channel capacity for use by the transmitter, (7) transmit-power control, and/or (8) dynamic spectrum management. As used herein, the phrase "cognitive device" may include any device which may carry out cognitive tasks, such as a cognitive radio, or a cognitive receiver. As used herein, the phrase "cognitive information" may include any information which may be used to assist in carrying out a cognitive task. As used herein, the phrase "cognitive instruction" may include any instruction which may help accomplish a cognitive task.

In some examples of the present disclosure, a method is described for spectrum sensing within a cognitive radio.

Some methods may include but are not limited to scanning radio frequencies within an initial portion of the radio frequency spectrum and analyzing the frequencies scanned within the initial portion. The methods may also include but are not limited to dividing the initial portion of the radio frequency spectrum into first and second portions, and selecting one of the first and second portions for further analysis.

In some additional examples, methods may be described for communicating in a communications system comprising a cognitive radio including but not limited to a receiver for processing a spectrum sensing task and a transmitter for transmitting a digital or analog communication to a communications device. The method includes but is not limited to using the receiver to scan for radio frequencies within an initial portion of the radio frequency spectrum and analyzing the frequencies scanned within the initial portion. The method may also include but is not limited to selecting a portion of the radio frequency spectrum within the initial portion for further analysis.

In yet other examples, methods may be described for operating a cognitive radio. The methods may include but are not limited to scanning for radio frequencies within an initial portion of the radio frequency spectrum and analyzing the frequencies scanned within the initial portion. The methods may also include but are not limited to selecting a portion of the radio frequency spectrum within the initial portion which is more likely to have spectrum holes than another portion within the initial portion.

FIG. 1 depicts a cognitive radio for implementing at least some embodiments arranged in accordance with the present disclosure. As shown in FIG. 1, a cognitive radio 100 may include a processor 110, a memory 120 and one or more drives 130. The drives 130 and their associated computer storage media, may be configured to provide storage of computer readable instructions, data structures, program modules and other data for the cognitive radio 100. Drives 130 can include one or more of an operating system 140, application programs 150, program modules 160, and/or a database 180. Application programs 150, for example, may include an application program containing program instructions for causing a cognitive radio 100 to carry out the functions specified in FIG. 3, for example a method for conducting hierarchical spectrum sensing 152. Cognitive radio 100 may further include user input devices 190 through which a user may enter commands and data. Example input devices can include an electronic digitizer, a microphone, a keyboard and a pointing device, commonly referred to as a mouse, trackball or touch pad. Other example input devices may include a joystick, game pad, satellite dish, scanner, or the like.

These and other input devices can be connected to processor 110 through a user input interface that may be coupled to a system bus, but may be connected by other interface and bus structures, such as a parallel port, game port or a universal serial bus (USB). Cognitive radio 100 may also include a receiver 194 through which radio frequency signals may be received and a transmitter 195 through which radio frequency signals may be transmitted. Cognitive radio 100 with receiver 194 and without transmitter 195 may be referred to herein as a cognitive receiver, and cognitive radio 100 with transmitter 195 and without receiver 194 may be referred to herein as a cognitive transmitter. In some embodiments, the cognitive radio 100 may include a transceiver, instead of receiver 194 and transmitter 195, wherein the transceiver functionally operates as both a transmitter and a receiver.

Cognitive radio 100 may operate in a networking environment using connections to one or more computers, such as a remote computer coupled to network interface 196. The remote computer may be a personal computer (PC), a server, a router, a network PC, a peer device or other common network node, and can include some or all of the elements described above relative to cognitive radio 100. Networking environments are commonplace in offices, enterprise-wide area networks (WAN), local area networks (LAN), intranets and the Internet.

For example, cognitive radio 100 may be the source from which data is being migrated, and the remote computer may be the destination to which the data is being migrated, or vice versa. Note however, that the source and destination need not be connected by a network 108 or any other means, but instead data may be migrated via any media capable of being written by the source and read by the destination. When used in a LAN or WAN networking environment, cognitive radio 100 may be connected to the LAN through a network interface 196 or an adapter. When used in a WAN networking environment, cognitive radio 100 typically may include a modem or other means for establishing communications over the WAN, such as the Internet or network 108. It will be appreciated that other means of establishing a communications link between the source and destination may be used. Cognitive radio 100 may also be coupled to user output devices 197 for outputting information to a user. Example user output devices 197 may include a display, a printer and/or speakers.

Figure 2:
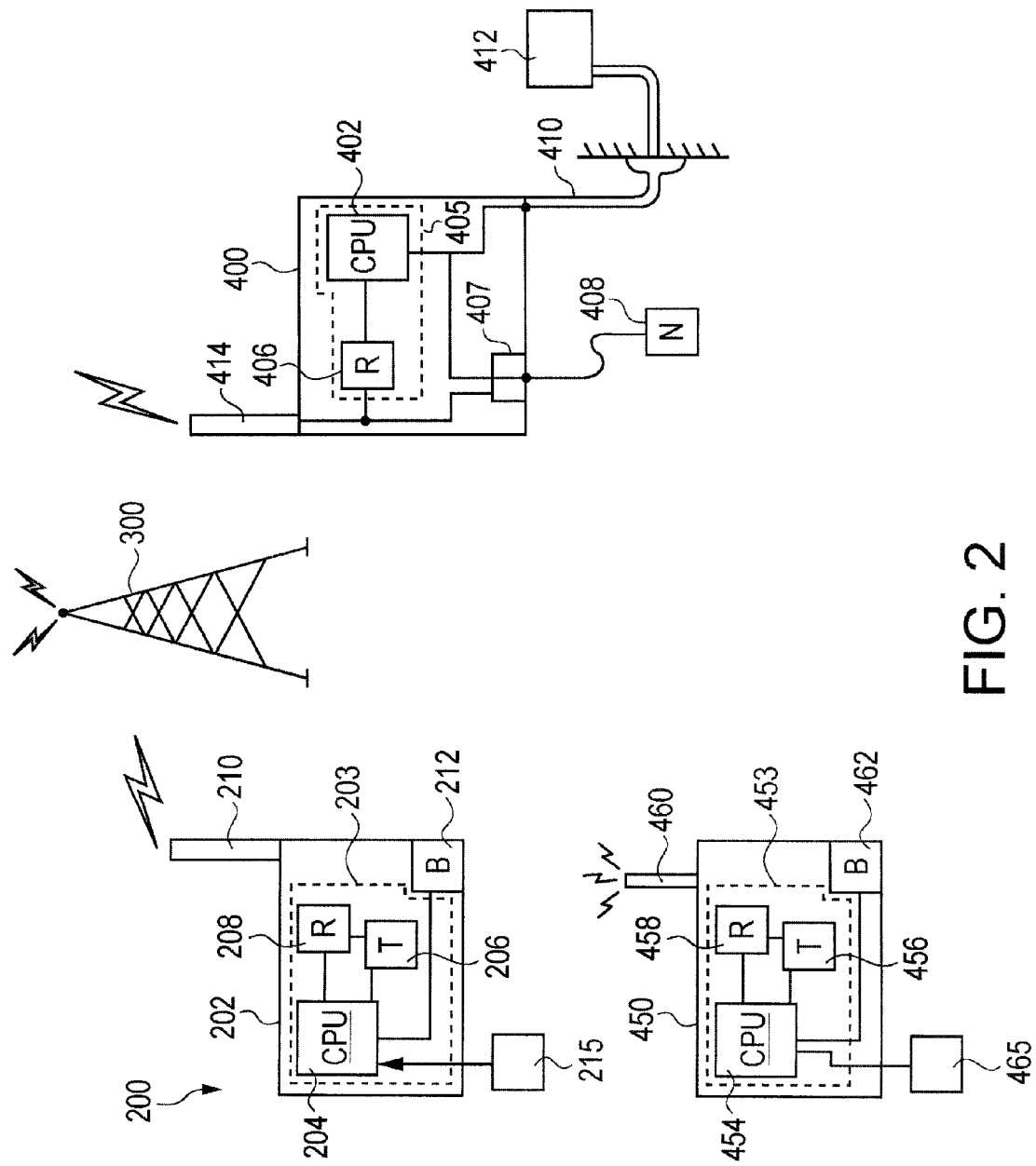
FIG. 2 depicts a schematic representation of a communications system.

FIG. 2 depicts a schematic representation of a communications system arranged in accordance with at least some embodiments of the present disclosure. As shown in FIG. 2, a communications system 200 may be provided. The communications system 200 may include a communications device 202 that may be arranged in communication with a cognitive device 400 and a transmission tower 300 and another communications device 450.

The communications device 202 may be any device that may be adapted to transmit or receive RF signals, and may be, for example, a wireless telephone, a radio, a hand-held two-way radio transceiver, or the like. The communications device 202 may include a cognitive radio 203, an antenna 210, and/or a power source 212. The cognitive radio 203 may be a wireless communication device that may be configured to change its transmission or reception parameters to communicate efficiently and avoid interference with licensed or unlicensed users of other communications devices 450. The cognitive radio 203 may be configured to perform cognitive tasks, which may include the alteration of parameters based on the active monitoring of several factors in the external and internal radio environment, such as, for example, radio frequency spectrum, user behavior and network state. The cognitive tasks performed by cognitive radio 203 may begin with the passive sensing of RF stimuli, called spectrum sensing. The following are examples of other optional cognitive tasks performed by cognitive radio 203: (1) radio-scene analysis, which may encompass: (1)(a) estimating interference temperature (a metric which quantifies sources of interference in a radio environment); and/or (1)(b) detecting spectrum holes, by spectrum sensing; (2) channel identification, which may encompass: (2)(a) estimation of channel-state information; and/or (2)(b) prediction of channel capacity for use by the transmitter; and/or (3) transmit-power control and dynamic spectrum management.

Cognitive radio 203 functionally may include all or some of the components of cognitive radio 100, as described herein. Cognitive radio 203 may include at least a processor 204 arranged in communication with a receiver 208 and optionally a transmitter 206. Transmitter 206 and receiver 208 may be replaced with a transceiver. Processor 204 may be configured to send cognitive instructions to both the receiver 208 and transmitter 206 and may be configured to receive cognitive information, such as spectrum sensing information, from the receiver 208 when performing and processing cognitive tasks, such as spectrum sensing tasks. Communications device 202 may also include an input device 215 for inputting a communication received by processor 204. Input device 215 can include an electronic digitizer, a microphone, a keyboard and pointing device, commonly referred to as a mouse, trackball or touch pad. Other input devices may include a joystick, game pad, satellite dish, scanner, or the like.

The spectrum-sensing task may be utilized to detect spectrum holes, which may be bands of unused radio frequencies in the radio frequency (RF) spectrum available for use by cognitive radio 203. The cognitive radio 203 and/or cognitive receiver 405 may be adapted to passively sense the RF spectrum and estimate the power spectra of incoming radio frequency stimuli, in order to classify the RF spectrum into one of three broadly defined types of radio frequencies: (1) black spaces, which may be occupied by high-power "local" interferers some of the time; (2) grey spaces, which may partially be occupied by low-power interferers; and (3) white spaces, which may be substantially free of RF interferers except for ambient noise, made up of natural and artificial forms of noise. Ambient noise may include: broadband thermal noise produced by external physical phenomena such as solar radiation; transient reflections from lightening, plasma (fluorescent) lights, and aircraft; impulsive noise produced by ignitions, commutators, and microwave appliances; and/or thermal noise due to internal spontaneous fluctuations of electrons at the front end of individual receivers.

White spaces and grey spaces, to a lesser extent, may contain spectrum holes which make good candidates for use by cognitive radio 203. While black spaces may generally be avoided when and where the RF emitters residing in them are switched ON, when those emitters are switched OFF, the black spaces may assume a new role of "spectrum holes," and the cognitive radio 203 and/or cognitive receiver 405 may provide the opportunity for discovering significant "white spaces" within the unused black spaces by invoking a dynamic-coordination capability for spectrum sharing.

As a result, by conducting a spectrum sensing task, cognitive radio 203 may be able to determine which portion of the RF spectrum contains frequencies which are not being utilized, identifying spectrum holes. Thereafter, receiver 208 within cognitive radio 203 and/or cognitive receiver 405 may be arranged to communicate spectrum sensing information which may contain information regarding spectrum holes, to processor 204 within cognitive radio 203. The spectrum sensing information may typically contain bands of frequencies within the white spaces and the grey spaces, however sometimes the bands of frequencies may be within the black spaces. Cognitive radios are described in: Haykin, S. "Cognitive Radio: Brain-Empowered Wireless Communications," IEEE JOURNAL ON SELECTED AREAS IN COMMUNICATIONS, Vol. 23, No. 2, pp. 201-220 (February 2005).

Upon conducting a spectrum-sensing task and determining which portion of the RF spectrum contains frequencies which may not be utilized (or available), receiver 208 within cognitive radio 203 may be arranged to communicate spectrum sensing information, which may contain information about spectrum holes, to processor 204 within cognitive radio 203. The spectrum sensing information may contain bands of frequencies that may be within the white spaces and the grey spaces, or the bands of frequencies may be within the black spaces.

In some embodiments, when performing a spectrum sensing task, the processor 204 may be configured to send cognitive instructions to the receiver 208 instructing the receiver 208 to scan the RF spectrum for spectrum holes. The receiver 208 may be configured to send spectrum sensing information to the processor 204 informing the processor 204 of spectrum holes (i.e., receiver 208 may inform the processor 204 which bands of RF frequencies may be available for use). The processor 204 may be configured to send cognitive instructions to the transmitter 206 which may be configured to transmit at a radio frequency available for use, or within one of the spectrum holes.

Receiver 208 may be configured to receive RF signals, either digital or analog, from antenna 210 and transmitter 206 may be arranged to transmit RF signals through antenna 210. Antenna 210 may be adapted to transmit or receive RF signals to transmission tower 300, which may broadcast these RF signals, for example, via land lines or other RF signals, to other communications devices, which may include wireless communications devices, such as communications device 450, or wired communications devices such as telephones. Antenna 210 may be adapted to send RF signals to and receive signals from other communications devices 450 and cognitive device 400.

Power source 212 may be arranged in communication with and may power cognitive radio 203. Power source 212 may be portable and may be, for example, a battery, a fuel cell, a lithium ion battery, and/or a capacitor.

Cognitive tasks, such as spectrum sensing, may require the detection of spectrum holes and their subsequent exploitation in the management of radio spectrum, which may be time consuming and may use significant power. By offloading some cognitive tasks from cognitive radio 203 to another device, such as cognitive device 400, the amount of electrical power used by communications device 202 may be reduced as along with the amount of computational power. The amount of time required to perform cognitive tasks within the communications device 202 may also be reduced.

Cognitive device 400 may include a cognitive receiver 405 configured for processing cognitive tasks, an antenna 414 adapted for receiving radio frequency signals, and a communications port 407. Cognitive device 400 may be arranged in communication with communications device 202 through a variety of means, such as, wired communication which may include USB, Firewire, and network cabling such as CAT-5 or fiber optic cable, or wireless communication which may include Bluetooth, Wi-Fi, WiMax, EDGE (Enhanced Data rates for GSM Evolution), GSM (Global System for Mobile communications), GPRS (General packet radio service), 3G, 4G, CDMA (Code division multiple access), or any other communications protocol which may transmit RF signals. In a LAN or WAN networking environment, cognitive device 400 may be in communication with communications device 202 through a network interface 196 (FIG. 1) or an adapter. In a WAN networking environment, cognitive device 400 may include a modem or other means for establishing communications over the WAN, such as the Internet or network 108 (FIG. 1). Other means of establishing a communications link between the cognitive device 400 and the communications device 202 may also be used.

The cognitive receiver 405 may be a wireless communication device which may be configured to change its reception parameters to communicate efficiently and avoid interference with licensed or unlicensed users of other communications devices 450. The cognitive receiver 405 may be arranged to perform cognitive tasks, which may include the alteration of parameters based on the active monitoring of several factors in the external and internal radio environment, such as radio frequency spectrum, user behavior and network state. The cognitive tasks performed by cognitive receiver 405 may begin with the passive sensing of RF stimuli, called spectrum sensing, and an action may follow. The following examples of cognitive tasks may be performed by cognitive receiver 405: (1) radio-scene analysis, which may encompass: (1)(a) estimating interference temperature (a metric which quantifies sources of interference in a radio environment); and/or (1)(b) detecting spectrum holes, by spectrum sensing; (2) channel identification, which may encompass: (2)(a) estimation of channel-state information; and/or (2)(b) prediction of channel capacity for use by the transmitter.

Cognitive receiver 405 may include substantially all the components of cognitive radio 100, as described herein. Cognitive receiver 405 may include at least a processor 402 that may be arranged in communication with a receiver 406. Processor 402 may be configured to send cognitive instructions to the receiver 406 and may be configured to receive cognitive information from the receiver 406 when performing and processing cognitive tasks, such as a spectrum sensing task.

In some examples, when performing a spectrum sensing task, the processor 402 may be arranged to send cognitive instructions to the receiver 406 instructing the receiver 406 to scan the RF spectrum for spectrum holes. The receiver 406 may be configured to send spectrum sensing information to the processor 402 informing the processor 402 of spectrum holes (i.e., receiver 406 may inform the processor 402 which bands of RF frequencies may be available for use). The process of sending spectrum sensing information to the processor 402 informing the processor 402 of spectrum holes may be repeated multiple times for different parts of the RF spectrum. The processor 402 may be configured to send the cognitive information through the communications port 407 to the communications device 202, which may be configured to receive the cognitive information through antenna 210 and forward the cognitive information to processor 204. Processor 204 may be configured to instruct the transmitter 206 to transmit at a radio frequency that may be available for use, or within one of the spectrum holes. In this manner, cognitive receiver 405 may be configured to perform certain cognitive tasks that would otherwise be performed by cognitive radio 203. In doing so, cognitive receiver 405 may be able to reduce the amount of electrical power and processing power used by cognitive radio 203. This may allow communications device 202 to be configured to operate with a less powerful processor 204 and a lower capacity power source 212 or operate for longer durations.

Communications port 407 may be arranged in communication with the communications device 202 and may be arranged to communicate cognitive information to communications device 202. Communications port 407 may be arranged in communication with the communications device 202 through a network 408. Communications port 407 may also be configured to directly communicate with communications device 202 through antenna 414, and may be adapted to communicate cognitive information directly to communications device 202. Network 408 may be arranged in communication with both communications device 202 and cognitive device 400, for example, via a wired or wireless connection.

Receiver 406 may be configured to receive RF signals, either digital or analog, from antenna 414. Antenna 414 may be adapted to transmit or receive RF signals to/from transmission tower 300, which may broadcast these RF signals, for example, via land lines or other RF signals, to other communications devices, which may include wireless communications devices, such as communications devices 202 and 450, or wired communications devices such as telephones.

Cognitive device 400 may include a power source 410 which may be arranged in communication with and power cognitive receiver 405. Power source 410 may include a power connector that may be configured to connect with a stationary power source 412, such as a power generating plant. In this manner, cognitive device 400 may be able to use a nearly limitless supply of power in order to process cognitive tasks which may otherwise be processed by communications device 202.

In some embodiments, communications device 450 may be substantially identical to communications device 202 and may contain identical components including a cognitive radio 453, an antenna 460, and/or a power source 462, which correspond with cognitive radio 203, antenna 210, and/or power source 212. The cognitive radio 453 may be a wireless communication device which may be configured to change its transmission or reception parameters to communicate efficiently and avoid interference with licensed or unlicensed users of other communications devices. Cognitive radio 453 may include at least one processor 454 arranged in communication with a receiver 458 and optionally a transmitter 456. Transmitter 456 and receiver 458 can be replaced with a transceiver. Communications device 450 may operate in substantially the same manner as communications device 202, as described herein. Communications device 450 may also include an input device 465 adapted for inputting a communication received by processor 454. Input device 465 can include an electronic digitizer, a microphone, a keyboard and pointing device, commonly referred to as a mouse, trackball or touch pad. Other input devices may include a joystick, game pad, satellite dish, scanner, or the like.

In some embodiments, when performing a spectrum sensing task, the processor 204 may be configured to send cognitive instructions to the receiver 208 instructing the receiver 208 to scan the RF spectrum for spectrum holes. The receiver 208 may be configured to send spectrum sensing information to the processor 204, informing the processor 204 of spectrum holes, thereby informing the processor 204 which bands of RF frequencies are available for use. The processor 204 may be configured to send cognitive instructions to the transmitter 206 to transmit a communication at a radio frequency available for use, or within one of the spectrum holes.

In some embodiments, communications system 200, cognitive radio 203 or 453, or cognitive receiver 405, may be configured to perform a hierarchical spectrum sensing task by sending hierarchical spectrum sensing instructions from processor 204, 402 or 454, to receiver 208, 406 and/or 458, as shown in FIG. 2. In turn, upon receiving the hierarchical spectrum sensing instructions, the receivers may employ a hierarchical spectrum sensing algorithm to scan an initial portion of the RF spectrum in a hierarchical manner in order to find spectrum holes. One or more of the receivers may be configured to scan portions of the RF spectrum.

The hierarchical spectrum sensing algorithm may begin by instructing the receivers to conduct a broad first scan of the initial portion of the RF spectrum. The initial portion may range from a first frequency to a second frequency. Upon scanning the initial portion, the hierarchical spectrum sensing algorithm may divide the initial portion of the RF spectrum into first sub-portions. The initial portion of the RF spectrum may be divided into any number of first sub-portions, for example 2-1000 sub-portions or 10-100 sub-portions. The information received from the scanning of the initial portion may be analyzed within each first sub-portion using a spectrum hole analysis in order to predict which first sub-portion or sub-portions within the initial portion is most likely to contain the spectrum holes. Upon determining which first sub-portion within the initial portion is more likely to contain spectrum holes, the hierarchical spectrum sensing algorithm may select that first sub-portion. Multiple first sub-portions may also be selected, as long as not all first sub-portions are selected. The first sub-portion(s) selected are referred to as the selected portion(s).

For example, if a sub-portion within the initial portion contains a low number of frequencies or no frequencies which are in use, compared to the remaining sub-portions within the initial portion, then the spectrum hole analysis may conclude that the sub-portion is more likely to contain spectrum holes than any of the other sub-portions. In another example, if the frequencies in use within a first sub-portion have a lower average signal strength than the frequencies in use within the remaining sub-portions, then the spectrum hole analysis may conclude that the sub-portion is less crowded and therefore more likely to contain spectrum holes than the remaining sub-portions. In another example, each of the first sub-portions may be classified as a black space, a grey space or a white space, and only the sub-portions classified as white spaces, or alternatively classified as white or grey spaces, may become the selected portion(s). In this manner, by conducting a spectrum hole analysis on first sub-portions within the initial portion, the hierarchical spectrum sensing algorithm may be able to determine which first sub-portion(s) within the initial portion is more likely contain spectrum holes. Upon determining which first sub-portion(s) within the initial portion more likely contain spectrum holes, the hierarchical spectrum sensing algorithm may select those one or more first sub-portion(s).

Upon identifying selected portion(s), the hierarchical spectrum sensing algorithm may either decide to end by reporting the selected portion(s) to the processor, or to conduct a narrower scan of the selected portion(s). For example, if the hierarchical spectrum sensing algorithm determines that the selected portion(s) are white spaces, or the selected portion(s) are grey spaces and the signal strength of the frequencies in use within the grey spaces are below a predetermined threshold, then the hierarchical spectrum sensing algorithm may report the selected portion(s) to the processor. If the hierarchical spectrum sensing algorithm decides to end by reporting the selected portion(s) to the processor, the processor may then instruct the transmitter 206 or 456 (FIG. 2) to transmit at a frequency within the selected portion(s).

If the hierarchical spectrum sensing algorithm decides not to end, it may then conduct a narrower, second scan of radio frequencies within the selected portion(s). Upon scanning the selected portion(s), the hierarchical spectrum sensing algorithm may then divide the selected portion(s) into second sub-portions, and using the information received from scanning the selected portions(s), each second sub-portion may be analyzed using a spectrum hole analysis in order to predict which second sub-portion or sub-portions within the selected portion(s) are most likely contain spectrum holes. The selected portion(s) may be divided into any number of second sub-portions, for example 2-1000 sub-portions or 10-100 sub-portions. Upon determining which second sub-portion(s) within the selected portion(s) more likely contain spectrum holes, the hierarchical spectrum sensing algorithm may select that second sub-portion. Multiple second sub-portions may also be selected, as long as not all second sub-portions are selected. The second sub-portion(s) selected are referred to as the second selected portion(s).

Upon selecting second selected portion(s), the hierarchical spectrum sensing algorithm may either decide to either end hierarchical spectrum sensing and report the second selected portion(s) to the processor, or conduct a narrower further scan of the second selected portion(s). For example, if the hierarchical spectrum sensing algorithm determines that the selected portion(s) are white spaces, or the selected portion(s) are grey spaces and the signal strength of the frequencies in use within the grey spaces are below a predetermined threshold, then the hierarchical spectrum sensing algorithm may report the selected portion(s) to the processor. Narrower and narrower scans of selected portion(s) where the selected portion(s) are further divided into sub-portions may be conducted by the hierarchical spectrum sensing algorithm until the hierarchical spectrum sensing algorithm determines that hierarchical spectrum sensing should end and report the selected portion(s) to the processor. Upon determining the selected portion(s) using the hierarchical spectrum sensing algorithm, the processor may determine which frequencies are available for transmission and may then instruct transmitter 206 or 465 (FIG. 2) to transmit a communication using an available transmission frequency that is within the selected portion(s) discovered as a result of hierarchical spectrum sensing.

As used herein, the phrases "narrower scans," "narrower second scan," "narrower further scan," "narrower and narrower scans," and the like, may refer to the resolution of the scan(s) or the width (in units of frequency) of features within scans which may be detected; a narrower scan may be a higher resolution scan. Accordingly, successive scans and information obtained from successive scans may be more detailed, for example by sampling more frequencies within the scanned portion(s) of the RF spectrum, by sampling frequencies which differ by a smaller amount within the scanned portions, or by using a more computationally accurate analysis, as compared to an earlier scan and analysis of a larger portion of the RF spectrum. The term "broad" may be used to characterize the first scan, since the first scan may be the least detailed or accurate scan and analysis.

Upon conducting the hierarchical spectrum sensing task, and determining which portion of the RF spectrum contains frequencies which are not being utilized, the processor may be provided with a portion or portions of the RF spectrum containing frequencies available for use. The selected portion(s) may contain bands of frequencies that have a high probability of being within white spaces and grey spaces. In some implementations, the selected portion(s) may be within the black spaces.

Upon receiving selected portion(s), the processor may be configured to determine which frequencies are available for transmission. The processor may then be arranged to instruct a transmitter to transmit a communication using an available transmission frequency that is within the selected portion(s) discovered as a result of hierarchical spectrum sensing. The available transmission frequencies may be within the selected portion(s) which are available for use, and which may be used to transmit a communication. The communication, such as a digital communication, may include any information, or data, which can be encoded for computer storage and processing purposes, and may include any type of data such as hexadecimal data, decimal data, binary data, or ASCII character data. The information included in a communications may be encoded audio signals, encoded video signals, text, and any other type of data. In this manner, communications system 200, and/or cognitive radio 203 or 453 (FIG. 2) may be adapted to find an available transmission frequency and transmit a communication using an available transmission frequency.

Figure 3:
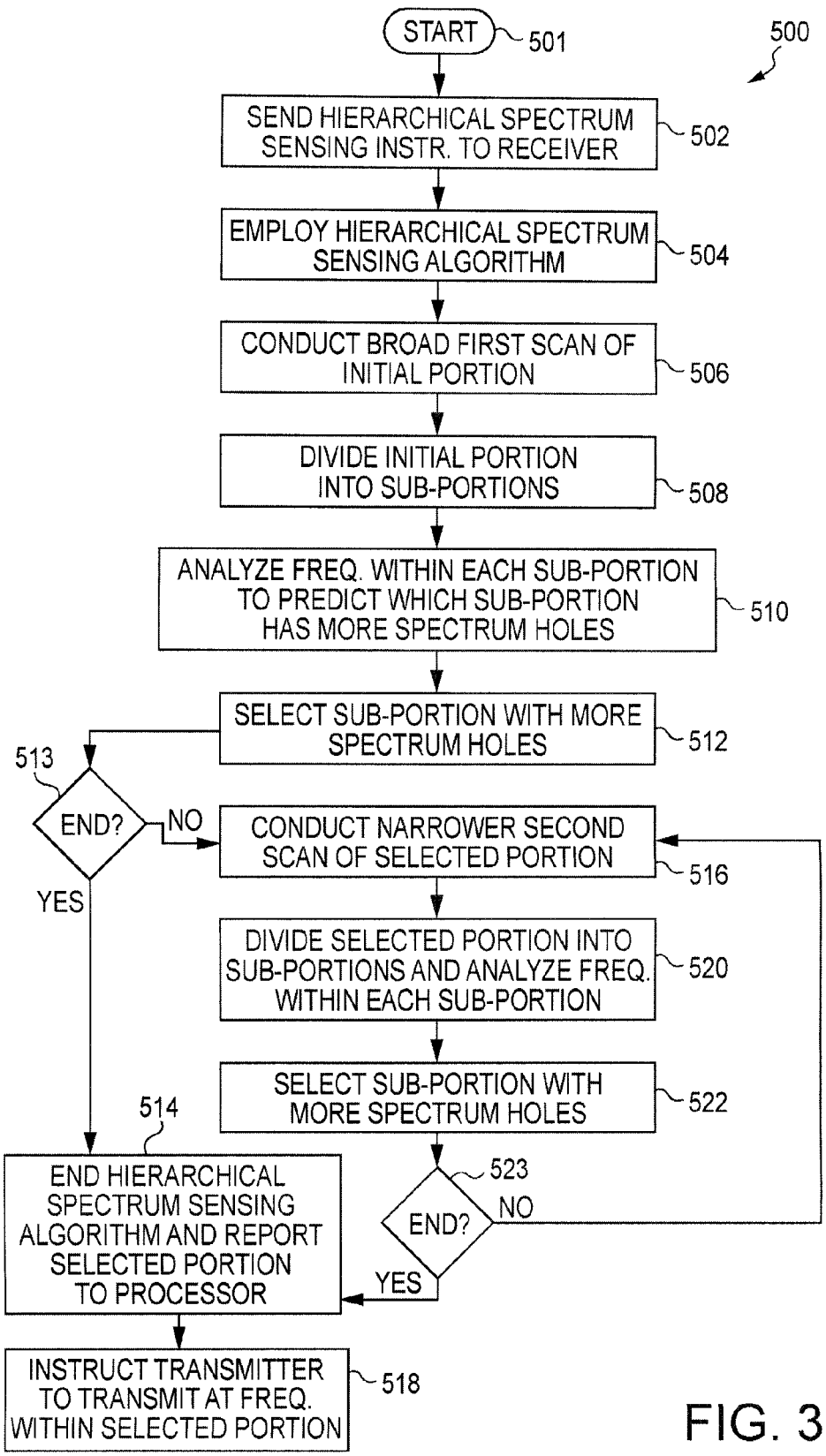
FIG. 3 is a flowchart illustration of methods, apparatus (systems) and computer program products, all arranged in accordance with at least some embodiments of the present disclosure.

FIG. 3 is a flowchart illustration of methods, apparatus (systems) and computer program product; FIG. 3 is also an example process, all arranged in accordance with at least some examples of the present disclosure. It will be understood that each block of the flowchart illustration in FIG. 3, and combinations of blocks in the flowchart illustration in FIG. 3, can be implemented by computer program instructions. These computer program instructions may be loaded onto a computer, a processor, or other programmable data processing apparatus to produce a machine, such that the instructions which execute on the computer or other programmable data processing apparatus create means for implementing the functions specified in the flowchart block or blocks. These computer program instructions may also be stored in a storage device that can direct a computer, a processor or other programmable data processing apparatus to function in a particular manner, such that the instructions stored in the storage device produce an article of manufacture including instruction means which implement the function specified in the flowchart block or blocks. The computer program instructions may also be loaded onto a computer, a processor or other programmable data processing apparatus to cause a series of operational steps to be performed on the computer, processor or other programmable data processing apparatus to produce a computer implemented process such that the instructions which execute on the computer, process or other programmable apparatus provide steps for implementing the functions and/or operations specified in the flowchart block or blocks.

Accordingly, blocks of the flowchart illustration in FIG. 3 support combinations of means for performing the specified functions, combinations of steps for performing the specified functions and program instruction means for performing the specified functions. It will also be understood that each block of the flowchart illustration in FIG. 3, and combinations of blocks in the flowchart illustration in FIG. 3, can be implemented by special purpose hardware-based computer systems which may perform the specified functions, operations, actions or steps, or combinations of special purpose hardware and computer instructions.

Such computer instructions may be fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

As seen in FIG. 3, a method 500 for conducting hierarchical spectrum sensing, may be initiated in block 501. Upon initiating the method 500 for conducting hierarchical spectrum sensing in block 501, processor 204, 402 or 454 (FIG. 2) may be configured to send hierarchical spectrum sensing instructions to one or more of the receivers 208, 406 and 458 (FIG. 2), at block 502. The hierarchical spectrum sensing instructions may be adapted to instruct the receivers to scan an initial portion of the RF spectrum in order to find spectrum holes. Upon receiving the hierarchical spectrum sensing instructions, the receivers may employ a hierarchical spectrum sensing algorithm in order to find spectrum holes, at block 504.

The hierarchical spectrum sensing algorithm may begin by instructing the receivers to conduct a broad first scan of the initial portion of the RF spectrum, at block 506. Upon scanning the initial portion of radio frequencies, the hierarchical spectrum sensing algorithm may divide the initial portion into first sub-portions, at block 508. The initial portion may be divided into any number of first sub-portions, for example 2-1000 sub-portions or 10-100 sub-portions. The information received from the scanning of the initial portion may be analyzed within each first sub-portion using a spectrum hole analysis in order to predict which first sub-portion or sub-portions within the initial portion is most likely to contain the spectrum holes, at block 510. Upon determining which first sub-portion within the initial portion is more likely to contain spectrum holes, the hierarchical spectrum sensing algorithm may select that first sub-portion at block 512. Multiple first sub-portions may also be selected, as long as not all first sub-portions are selected. The first sub-portion(s) selected may be referred to as the selected portion(s).

Upon identifying the selected portion(s), the hierarchical spectrum sensing algorithm may implement a decision step at block 513 to decide either to end at block 514 by reporting the selected portion(s) to the processor, or to conduct a narrower second scan of the selected portion(s) and move to block 516. If the hierarchical spectrum sensing algorithm decides to end by reporting the selected portion(s) to the processor at block 514, the processor may then instruct the transmitter 206 or 456 (FIG. 2) to transmit at a frequency within the selected portion(s) at block 518.

If the hierarchical spectrum sensing algorithm decides not to end, it may then conduct a narrower, second scan of radio frequencies within the selected portion(s) at block 516. Upon scanning the selected portion(s), the hierarchical spectrum sensing algorithm may then divide the selected portion(s) into second sub-portions, and using the information received from scanning the selected portions(s), each second sub-portion may be analyzed using a spectrum hole analysis in order to predict which second sub-portion or sub-portions within the selected portion(s) most likely contain spectrum holes, at block 520. The selected portion(s) may be divided into any number of second sub-portions, for example 2-1000 sub-portions or 10-100 sub-portions. Upon determining which second sub-portion(s) within the selected portion(s) more likely contain spectrum holes, the hierarchical spectrum sensing algorithm may select that second sub-portion, at block 522. Multiple second sub-portions may also be selected, as long as not all second sub-portions are selected. The second sub-portion(s) selected may be referred to as the second selected portion(s).

Upon selecting second selected portion(s), the hierarchical spectrum sensing algorithm may implement a decision step at block 523 and either decide to end hierarchical spectrum sensing and report the second selected portion(s) to the processor at block 514, or to conduct a narrower further scan of the second selected portion(s) and proceed to block 516. Narrower and narrower scans of selected portions wherein the selected portions are further divided into sub-portions may be conducted by the hierarchical spectrum sensing algorithm until the hierarchical spectrum sensing algorithm determines that hierarchical spectrum sensing should end and report the selected portions to the processor at block 514. Upon determining the selected portion(s) using the hierarchical spectrum sensing algorithm, the processor may be configured to determine which frequencies are available for transmission and may then instruct transmitter 206 or 465 to transmit a communication using an available transmission frequency that is within the selected portion(s) discovered as a result of hierarchical spectrum sensing, at block 518.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

In the preceding description, various aspects of claimed subject matter have been described. For purposes of explanation, specific numbers, systems and/or configurations were set forth to provide a thorough understanding of claimed subject matter. However, it should be apparent to one skilled in the art and having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The invention claimed is:

1. A method for a processor to perform spectrum sensing in a communication system, the method comprising:
    scanning an initial portion of the radio frequency spectrum to collect initial spectrum sensing information;
    dividing the initial portion into a plurality of first sub-portions of the radio frequency spectrum;
    selecting a first sub-portion from the plurality of first sub-portions based on the initial spectrum sensing information, to obtain a first selected portion;
    scanning the first selected portion, to collect second spectrum sensing information;
    dividing the first selected portion into a plurality of second sub-portions of the radio frequency spectrum;
    selecting a second sub-portion from the plurality of second sub-portions based on the second spectrum sensing information, to obtain a second selected portion, wherein the second selected portion contains a spectrum hole;
    scanning the second selected portion, to collect third spectrum sensing information, where scanning the second selected portion includes one of
        sampling more frequencies within the second selected portion of the radio frequency spectrum as compared to scanning the first selected portion,
        sampling frequencies which differ by a smaller amount within the second selected portion as compared to scanning the first selected portion, or
        using a more computationally accurate analysis as compared to scanning the first selected portion;
    dividing the second selected portion into a plurality of third sub-portions of the radio frequency spectrum; and
    selecting a third sub-portion from the plurality of second sub-portions based on the third spectrum sensing information, to obtain a third selected portion, wherein the third selected portion contains the spectrum hole.

2. The method of claim 1, wherein selecting the first sub-portion comprises selecting multiple first sub-portions.

3. The method of claim 1, wherein the second spectrum sensing information is more detailed than the first spectrum sensing information.

4. The method of claim 3, wherein the third spectrum sensing information is more detailed than the second spectrum sensing information.

5. The method of claim 1, further comprising transmitting a communication at a frequency of the spectrum hole.

6. The method of claim 5, wherein the second spectrum sensing information is more detailed than the first spectrum sensing information.

7. A non-transitory computer program product comprising software encoded in computer-readable media, for spectrum sensing with a communications system, the software comprising instructions, operable when executed, to:
scan an initial portion of the radio frequency spectrum, to collect initial spectrum sensing information;
divide the initial portion into a plurality of first sub-portions of the radio frequency spectrum;
select a first sub-portion from the plurality of first sub-portions based on the initial spectrum sensing information, to obtain a first selected portion;
scan the first selected portion, to collect second spectrum sensing information;
divide the first selected portion into a plurality of second sub-portions of the radio frequency spectrum;
select a second sub-portion from the plurality of second sub-portions based on the second spectrum sensing information, to obtain a second selected portion, wherein the second selected portion contains a spectrum hole;
scan the second selected portion, to collect third spectrum sensing information, where scanning the second selected portion includes one of
sampling more frequencies within the second selected portion of the radio frequency spectrum as compared to scanning the first selected portion,
sampling frequencies which differ by a smaller amount within the second selected portion as compared to scanning the first selected portion, or
using a more computationally accurate analysis as compared to scanning the first selected portion;
divide the second selected portion into a plurality of third sub-portions of the radio frequency spectrum; and
select a third sub-portion from the plurality of second sub-portions based on the third spectrum sensing information, to obtain a third selected portion, wherein the third selected portion contains the spectrum hole.

8. The computer program product of claim 7, wherein the instruction to select the first sub-portion comprises instruction to select multiple first sub-portions.

9. The computer program product of claim 7, wherein the second spectrum sensing information is more detailed than the first spectrum sensing information.

10. The computer program product of claim 7, the software further comprising instructions, operable when executed, to transmit a communication at a frequency within the spectrum hole.

11. The computer program product of claim 10, wherein the second spectrum sensing information is more detailed than the first spectrum sensing information.

12. A communications system, comprising:
a first cognitive device, comprising
a first receiver;
a first processor arranged in communication with the first receiver, wherein the first processor is configured to cooperate with the first receiver to:
scan an initial portion of the radio frequency spectrum with the first receiver, to collect initial spectrum sensing information;
divide the initial portion into a plurality of first sub-portions of the radio frequency spectrum, with the first processor;
select a first sub-portion from the plurality of first sub-portions based on the initial spectrum sensing information with the first processor, to obtain a first selected portion;
scan the first selected portion with the first receiver, to collect second spectrum sensing information;
divide the first selected portion into a plurality of second sub-portions of the radio frequency spectrum, with the first processor;
select a second sub-portion from the plurality of second sub-portions based on the second spectrum sensing information with the first processor, to obtain a second selected portion, wherein the second selected portion contains a spectrum hole;
scan the second selected portion, to collect third spectrum sensing information, where scanning the second selected portion includes one of
sampling more frequencies within the second selected portion of the radio frequency spectrum as compared to scanning the first selected portion,
sampling frequencies which differ by a smaller amount within the second selected portion as compared to scanning the first selected portion, or
using a more computationally accurate analysis as compared to scanning the first selected portion;
divide the second selected portion into a plurality of third sub-portions of the radio frequency spectrum; and
select a third sub-portion from the plurality of second sub-portions based on the third spectrum sensing information, to obtain a third selected portion, wherein the third selected portion contains the spectrum hole.

13. The communications system of claim 12, wherein the first processor, being configured to cooperate with the first receiver to select the first sub-portion, comprises the first processor, being configured to cooperate with the first receiver to select multiple first sub-portions.

14. The communications system of claim 12, further comprising a second cognitive device arranged in communication with the first cognitive device, the second cognitive device comprising:
a second receiver; and
a second processor arranged in communication with the second receiver.

15. The communications system of claim 14, wherein the first cognitive device is arranged to communicate with the second cognitive device through a network.

16. The communications system of claim 14, wherein
the second cognitive device is a cognitive radio that further comprises a transmitter arranged in communication with the second processor, and
the second processor is configured to cooperate with the transmitter to transmit a communication at a frequency of the spectrum hole.

* * * * *